(12) United States Patent
Kato et al.

(10) Patent No.: US 11,299,014 B2
(45) Date of Patent: Apr. 12, 2022

(54) REFRIGERATION CYCLE DEVICE

(71) Applicant: DENSO CORPORATION, Kariya (JP)

(72) Inventors: Yoshiki Kato, Kariya (JP); Naoya Makimoto, Kariya (JP); Takuya Fuse, Kariya (JP)

(73) Assignee: DENSO CORPORATION, Kariya (JP)

( * ) Notice: Subject to any disclaimer, the term of this patent is extended or adjusted under 35 U.S.C. 154(b) by 96 days.

(21) Appl. No.: 16/808,179

(22) Filed: Mar. 3, 2020

(65) Prior Publication Data

US 2020/0198443 A1 Jun. 25, 2020

Related U.S. Application Data

(63) Continuation of application No. PCT/JP2018/030822, filed on Aug. 21, 2018.

(30) Foreign Application Priority Data

Sep. 21, 2017 (JP) .............................. JP2017-181630

(51) Int. Cl.
*B60H 1/32* (2006.01)
*B60H 1/00* (2006.01)

(52) U.S. Cl.
CPC ....... *B60H 1/3227* (2013.01); *B60H 1/00278* (2013.01); *B60H 1/00328* (2013.01);
(Continued)

(58) Field of Classification Search
CPC .............. B60H 1/3227; B60H 1/00278; B60H 1/00328; B60H 1/00885; B60H 1/3223; B60H 1/32284; B60H 2001/00928; B60H 2001/00307; B60H 2001/00961; B60H 1/00899; F25B 29/00
See application file for complete search history.

(56) References Cited

U.S. PATENT DOCUMENTS 9,561,704 B2 * 2/2017 Enomoto ................. F01P 7/165
9,581,370 B2 * 2/2017 Inaba ........................ F25B 1/10
(Continued)

FOREIGN PATENT DOCUMENTS

JP 2014234094 A 12/2014
JP 2015093561 A 5/2015

*Primary Examiner* — Ljiljana V. Ciric
(74) *Attorney, Agent, or Firm* — Harness, Dickey & Pierce, P.L.C.

(57) ABSTRACT

A refrigeration cycle device includes a high-temperature side heat exchanger, an expansion valve for decompressing the refrigerant flowing out of the high-temperature side heat exchanger, a low-temperature side heat exchanger that exchanges heat between the refrigerant decompressed by the expansion valve and coolant, a high-temperature coolant circuit in which the coolant circulates to the high-temperature side heat exchanger, a low-temperature coolant circuit in which the coolant circulates to the low-temperature side heat exchanger, a battery and a low-temperature side radiator configured to exchange heat with the coolant in the low-temperature coolant circuit; and a heat transfer portion configured to transfer heat from the high-temperature coolant circuit to the low-temperature coolant circuit such that the coolant dissipates heat in the battery and the low-temperature side radiator.

12 Claims, 6 Drawing Sheets

(52) U.S. Cl.
CPC ....... *B60H 1/00885* (2013.01); *B60H 1/3223* (2013.01); *B60H 1/32284* (2019.05); *B60H 2001/00928* (2013.01)

(56) References Cited

U.S. PATENT DOCUMENTS

| | | | | |
|---|---|---|---|---|
| 10,183,548 B2* | 1/2019 | Enomoto | ................ | B60L 58/26 |
| 10,400,662 B2* | 9/2019 | Enomoto | .................. | F01P 7/16 |
| 10,449,830 B2* | 10/2019 | Sugimura | .......... | B60H 1/32284 |
| 10,562,376 B2* | 2/2020 | Miura | ...................... | B60H 1/08 |
| 10,717,341 B2* | 7/2020 | Sugimura | ............. | F02M 26/31 |
| 10,723,199 B2* | 7/2020 | Kato | ........................ | B60H 1/00 |
| 10,723,203 B2* | 7/2020 | Kato | ........................ | F25B 5/04 |
| 10,752,089 B2* | 8/2020 | Sato | ......................... | B60H 1/00 |
| 10,759,257 B2* | 9/2020 | Katoh | ...................... | F25B 5/04 |
| 10,837,348 B2* | 11/2020 | Enomoto | ................ | B60H 1/00 |
| 10,899,195 B2* | 1/2021 | Miura | ..................... | F25B 29/00 |
| 10,906,141 B2* | 2/2021 | Omi | ......................... | H05K 7/20 |
| 10,950,909 B2* | 3/2021 | Miura | ................ | H01M 10/633 |
| 10,989,447 B2* | 4/2021 | Miura | ....................... | F25B 6/04 |
| 11,180,000 B2* | 11/2021 | Aikawa | .............. | B60H 1/00899 |
| 2003/0167925 A1* | 9/2003 | Aikawa | .............. | B60H 1/00492 |
| | | | | 96/126 |
| 2011/0154839 A1* | 6/2011 | Mihara | .................... | F25B 9/008 |
| | | | | 62/151 |
| 2011/0154840 A1* | 6/2011 | Mihara | .................... | F25B 45/00 |
| | | | | 62/196.1 |
| 2013/0081419 A1* | 4/2013 | Katoh | ..................... | B60H 1/004 |
| | | | | 62/278 |
| 2014/0041826 A1* | 2/2014 | Takeuchi | ........... | B60H 1/00899 |
| | | | | 165/10 |
| 2015/0040594 A1* | 2/2015 | Suzuki | ............... | B60H 1/00335 |
| | | | | 62/159 |
| 2015/0101789 A1* | 4/2015 | Enomoto | ................ | B60L 50/16 |
| | | | | 165/202 |
| 2016/0031291 A1* | 2/2016 | Enomoto | ........... | B60H 1/00385 |
| | | | | 62/179 |
| 2016/0101666 A1 | 4/2016 | Sugimura et al. | | |
| 2017/0197490 A1* | 7/2017 | Enomoto | ........... | B60H 1/00485 |
| 2018/0201098 A1* | 7/2018 | Katoh | ................ | B60H 1/00007 |
| 2019/0366800 A1* | 12/2019 | Durrani | .............. | B60H 1/00021 |
| 2020/0164719 A1* | 5/2020 | Shiratori | ................... | F25B 1/00 |

* cited by examiner

FIG. 6

REFRIGERATION CYCLE DEVICE

CROSS REFERENCE TO RELATED APPLICATION

The present application is a continuation application of International Patent Application No. PCT/JP2018/030822 filed on Aug. 21, 2018, which designated the U.S. and claims the benefit of priority from Japanese Patent Application No. 2017-181630 filed on Sep. 21, 2017. The entire disclosures of all of the above applications are incorporated herein by reference.

TECHNICAL FIELD

The present disclosure relates to a refrigeration cycle device that heats a heat medium with a high-pressure refrigerant and cools the heat medium with a low-pressure refrigerant.

BACKGROUND

A thermal management device for a vehicle may be designed to cool a coolant in a first coolant circuit with a low-pressure refrigerant in a refrigeration cycle and to heat a coolant in a second coolant circuit with a high-pressure refrigerant in the refrigeration cycle.

When the temperature of the coolant in the first coolant circuit is below a first predetermined temperature, the thermal management device switches to a coupling mode of coupling the first coolant circuit and the second coolant circuit. On the other hand, when the temperature of the coolant in the first coolant circuit is equal to or higher than a second predetermined temperature, the thermal management device switches to a non-coupling mode of not coupling the first coolant circuit and the second coolant circuit.

SUMMARY

The present disclosure provides a refrigeration cycle device which heats a thermal medium with a high-pressure refrigerant and cools the thermal medium with a low-pressure refrigerant. The refrigerant cycle device according to an aspect of the present disclosure may include: a compressor configured to draw and discharge a refrigerant; a high-temperature side heat exchanger configured to exchange heat between the refrigerant discharged from the compressor and a heat medium; a decompression valve configured to decompress the refrigerant flowing out of the high-temperature side heat exchanger; a low-temperature side heat exchanger configured to exchange heat between the refrigerant decompressed by the decompression valve and the heat medium; a high-temperature side heat medium circuit in which the heat medium circulates to the high-temperature side heat exchanger; a low-temperature side heat medium circuit in which the heat medium circulates to the low-temperature side heat exchanger; a heat exchanging portion located in the low-temperature side heat medium circuit to exchanges heat with the heat medium; and a heat transfer portion configured to transfer heat from the high-temperature side heat medium circuit to the low-temperature side heat medium circuit and to cause the heat medium to dissipate heat in the heat exchanging portion.

Since the heat medium can dissipate heat into the heat exchanging portion by providing the heat transfer portion, the heat exchanging portion can be heated with a simple configuration.

DESCRIPTION OF EMBODIMENTS

According to the studies by the inventors of the present disclosure, a thermal management device for a vehicle may be designed to cool a coolant in a first coolant circuit with a low-pressure refrigerant in a refrigeration cycle and to heat a coolant in a second coolant circuit with a high-pressure refrigerant in the refrigeration cycle. In this case, the temperature of the coolant in the first coolant circuit may be controlled not to be equal to or higher than a predetermined temperature so that the coolant can absorb heat from the outside air in a radiator of the first coolant circuit. Thus, when a battery is disposed in the first coolant circuit of the thermal management device, the battery can be cooled. However, in this case, it may be difficult to heat the battery even when the battery needs to be heated, for example, upon start-up of a vehicle or the like. Furthermore, defrosting cannot be effectively performed when frost is formed on the radiator in some cases.

For example, the heating of the battery or the defrosting of the radiator is considered to be performed by a hot-gas operation of the refrigeration cycle. In the case of making the hot-gas operation implementable, the configuration of the refrigeration cycle becomes complicated, thereby deteriorating its mountability on the vehicle. Furthermore, an accumulator becomes necessary, thereby degrading the cooling performance of the refrigeration cycle.

In view of the above, it is an object of the present disclosure to provide a refrigeration cycle device which can heat a thermal medium with a high-pressure refrigerant and cool the thermal medium with a low-pressure refrigerant. In the refrigeration cycle device, a heat exchanging portion in which the heat medium cooled by the low-pressure refrigerant is heat-exchanged can be heated with a simple structure.

Hereinafter, detail embodiments will be described with reference to the accompanying drawings. In the following respective embodiments, portions that are the same or equivalent to each other are denoted by the same reference numerals through the drawings.

First Embodiment

An embodiment will be described below with reference to the accompanying drawings. A vehicle air conditioner 1 shown in FIGS. 1 to 4 is an air conditioner that regulates an interior space of a vehicle cabin (in other words, a space to be air-conditioned) to an appropriate temperature. The vehicle air conditioner 1 includes a refrigeration cycle device 10. In the present embodiment, the refrigeration cycle device 10 is mounted on a hybrid vehicle that obtains a driving force for running the vehicle both from an engine (in other words, an internal combustion engine) and a running electric motor.

The hybrid vehicle of the present embodiment is configured as a plug-in hybrid vehicle that includes a battery mounted on the vehicle (in other words, a vehicle-mounted battery) and rechargeable with electric power supplied from an external power source (in other words, a commercial power source) when the vehicle stops. As the battery, for example, a lithium-ion battery can be used.

The driving force output from the engine is used not only for running the vehicle, but also for operating a generator. Then, the electric power generated by the generator and the electric power supplied from the external power source can be stored in the battery. The electric power stored in the battery is supplied not only to the running electric motor, but also to various vehicle-mounted devices, such as electric components constituting the refrigeration cycle device 10.

Figure 1:
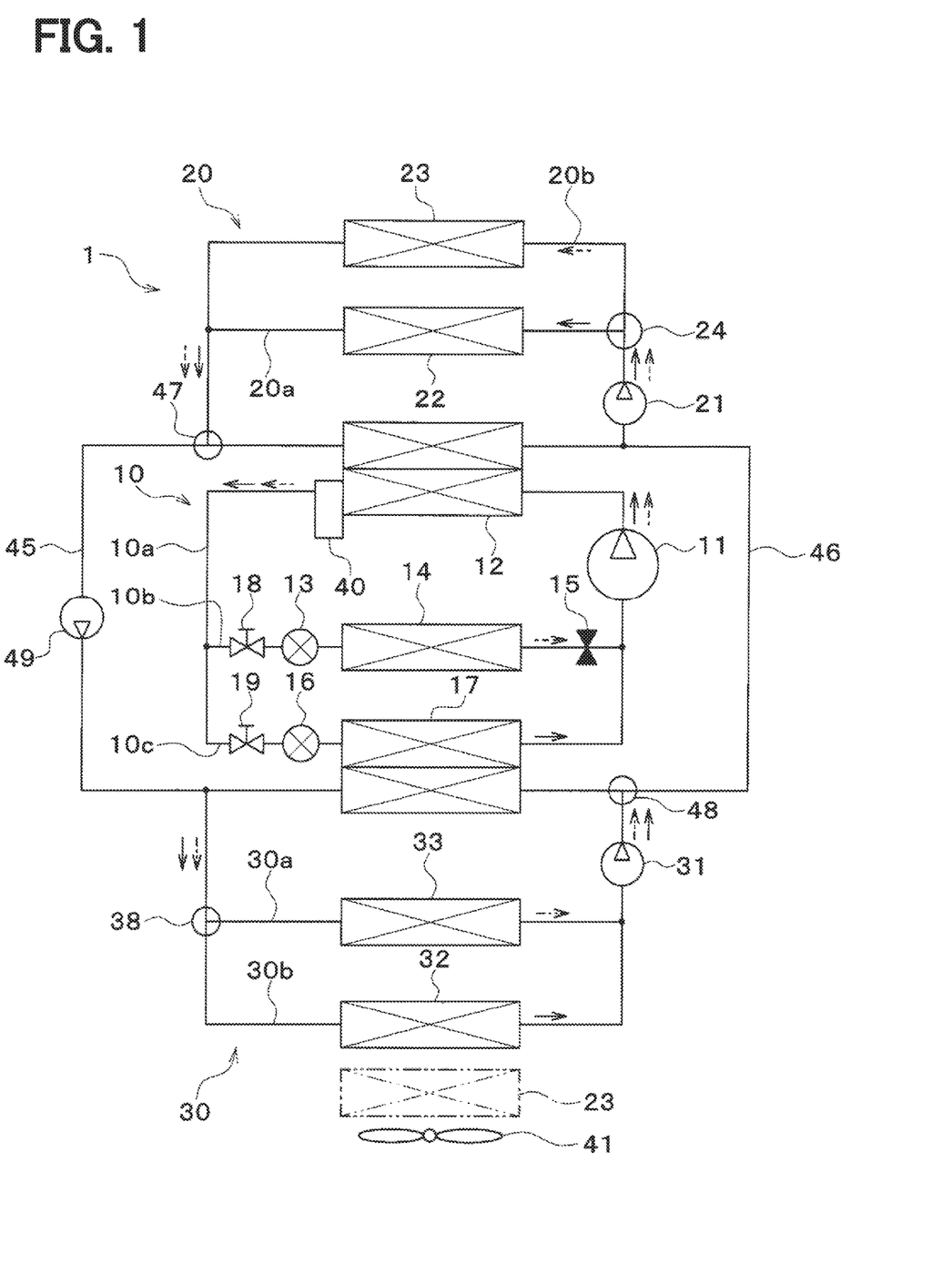
FIG. 1 is an entire configuration diagram of a refrigeration cycle device in a first embodiment.

The refrigeration cycle device 10 is a vapor compression refrigerator that includes a compressor 11, a condenser 12, a receiver 40, a first expansion valve 13, an air cooling evaporator 14, a constant pressure valve 15, a second expansion valve 16, and a coolant cooling evaporator 17. The refrigeration cycle device 10 of the present embodiment constitutes a subcritical refrigeration cycle in which a high-pressure side refrigerant pressure does not exceed the critical pressure of the refrigerant, using a fluorocarbon refrigerant as the refrigerant.

The refrigeration cycle device 10 includes a series refrigerant flow passage 10a, a first parallel refrigerant flow passage 10b, and a second parallel refrigerant flow passage 10c. The series refrigerant flow passage 10a, the first parallel refrigerant flow passage 10b, and the second parallel refrigerant flow passage 10c are flow passages through which the refrigerant flows.

The series refrigerant flow passage 10a, the first parallel refrigerant flow passage 10b, and the second parallel refrigerant flow passage 10c form a refrigerant circulation circuit in which the refrigerant circulates. The first parallel refrigerant flow passage 10b and the second parallel refrigerant flow passage 10c are connected to the series refrigerant flow passage 10a so as to cause the refrigerants to flow through the first and second parallel refrigerant flow passages 10b and 10c in parallel.

In the series refrigerant flow passage 10a, the compressor 11, the condenser 12 and the receiver 40 are arranged in series with each other in this order in the flow of the refrigerant.

In the first parallel refrigerant flow passage 10b, the first expansion valve 13, the air cooling evaporator 14, and the constant pressure valve 15 are arranged in series with each other in this order, in the flow of the refrigerant.

In the second parallel refrigerant flow passage 10c, the second expansion valve 16 and the coolant cooling evaporator 17 are arranged in series in this order, in the flow of the refrigerant.

The series refrigerant flow passage 10a and the first parallel refrigerant flow passage 10b form a refrigerant circulation circuit in which the refrigerant circulates through the compressor 11, the condenser 12, the first expansion valve 13, the air cooling evaporator 14, the constant pressure valve 15, and the compressor 11 in this order.

The series refrigerant flow passage 10a and the second parallel refrigerant flow passage 10c form a refrigerant circulation circuit in which the refrigerant circulates through the compressor 11, the condenser 12, the second expansion valve 16, and the coolant cooling evaporator 17 in this order.

The compressor 11 is an electric compressor driven by the electric power supplied from the battery and draws, compresses, and discharges the refrigerant in the refrigeration cycle device 10. The compressor 11 may be a variable displacement compressor driven by a belt.

The condenser 12 is a high-pressure side refrigerant-heat medium heat exchanger that condenses a high-pressure side refrigerant by exchanging heat between the high-pressure side refrigerant discharged from the compressor 11 and the coolant in a high-temperature coolant circuit 20.

The coolant in the high-temperature coolant circuit 20 is a fluid serving as a heat medium. The coolant in the high-temperature coolant circuit 20 is a high-temperature heat medium. In the present embodiment, a liquid containing at least ethylene glycol, dimethylpolysiloxane, or nanofluid, or an antifreeze liquid is used as the coolant in the high-temperature coolant circuit 20. The high-temperature coolant circuit 20 is a high-temperature side heat medium circuit in which a high-temperature heat medium circulates.

The receiver 40 is a gas-liquid separator that separates the high-pressure refrigerant flowing thereinto from the condenser 12, into a gas-phase refrigerant and a liquid-phase refrigerant and causes the separated liquid-phase refrigerant to flow out to the downstream side, while storing an excess refrigerant in the cycle. The receiver 40 may be integrally formed with the condenser 12.

A first on-off valve 18 is disposed in the first parallel refrigerant flow passage 10b. The first on-off valve 18 is a solenoid valve that opens and closes the first parallel refrigerant flow passage 10b. The operation of the first on-off valve 18 is controlled by a control signal output from a controller 60. The first on-off valve 18 is a mode switching portion that switches between an air-heating mode and an air-cooling mode.

The first expansion valve 13 is a first decompression portion that decompresses and expands the liquid-phase refrigerant flowing out of the receiver 40. The first expansion valve 13 is a mechanically thermal expansion valve. The mechanically thermal expansion valve has a thermal-sensitive portion and is a thermal expansion valve that drives a valve body by a mechanical mechanism, such as a diaphragm.

The air cooling evaporator 14 is a refrigerant-air heat exchanger that cools air to be blown into the interior of the vehicle cabin by exchanging heat between the refrigerant flowing out of the first expansion valve 13 and the air to be blown into the interior of the vehicle cabin. In the air cooling evaporator 14, the refrigerant absorbs heat from the air to be blown into the interior of the vehicle cabin.

The constant pressure valve 15 is a pressure adjusting portion (in other words, a pressure adjustment decompression portion) that maintains the pressure of the refrigerant on the outlet side of the air cooling evaporator 14 at a predetermined value.

The constant pressure valve 15 is constituted of a mechanically variable throttle mechanism. Specifically, the constant pressure valve 15 decreases the passage area of the refrigerant passage (i.e., throttle opening degree) when the pressure of the refrigerant on the outlet side of the air cooling evaporator 14 is below a predetermined value, whereas the constant pressure valve 15 increases the passage area of the refrigerant passage (i.e., throttle opening degree) when the pressure of the refrigerant on the outlet side of the air cooling evaporator 14 exceeds the predetermined value.

For example, when variations in the flow rate of the circulation refrigerant that circulates in the cycle are small, a fixed throttle, such as an orifice or a capillary tube, may be adopted, instead of the constant pressure valve 15.

A second on-off valve 19 is disposed in the second parallel refrigerant flow passage 10c. The second on-off valve 19 is a solenoid valve that opens and closes the second parallel refrigerant flow passage 10c. The operation of the second on-off valve 19 is controlled by a control signal output from the controller 60.

The second expansion valve 16 is a second decompression portion that decompresses and expands the liquid-phase refrigerant flowing out of the condenser 12. The second expansion valve 16 is a mechanically thermal expansion valve that is substantially the same as the first expansion valve 13.

The coolant cooling evaporator 17 is a low-pressure side refrigerant-heat medium heat exchanger that evaporates a low-pressure refrigerant by exchanging heat between the low-pressure refrigerant flowing out of the second expansion valve 16 and the coolant in a low-temperature coolant circuit 30. The gas-phase refrigerant evaporated in the coolant cooling evaporator 17 is drawn into and compressed by the compressor 11.

The coolant in the low-temperature coolant circuit 30 is a fluid serving as a heat medium. The coolant in the low-temperature coolant circuit 30 is a low-temperature heat medium. In the present embodiment, a liquid containing at least ethylene glycol, dimethylpolysiloxane, or nanofluid, or an antifreeze liquid is used as the coolant in the low-temperature coolant circuit 30. The low-temperature coolant circuit 30 is a low-temperature side heat medium circuit in which a low-temperature heat medium circulates.

The condenser 12, a high-temperature side pump 21, a heater core 22, a high-temperature side radiator 23, and a high-temperature side three-way valve 24 are arranged in the high-temperature coolant circuit 20.

The high-temperature side pump 21 is a heat medium pump that draws and discharges a coolant. The high-temperature side pump 21 is an electric pump. The high-temperature side pump 21 is a high-temperature side flow-rate adjustment portion that adjusts the flow rate of the coolant circulating in the high-temperature coolant circuit 20.

The heater core 22 is an air heating heat exchanger that heats air to be blown into the interior of the vehicle cabin by exchanging heat between the coolant in the high-temperature coolant circuit 20 and the air to be blown into the interior of the vehicle cabin. In the heater core 22, the coolant dissipates heat into the air to be blown into the interior of the vehicle cabin. The high-temperature side radiator 23 is a high-temperature heat medium-outside air heat exchanger that exchanges heat between the coolant in the high-temperature coolant circuit 20 and the outside air.

The condenser 12, the high-temperature side pump 21, and the heater core 22 are disposed in a high-temperature side circulation flow passage 20a. The high-temperature side circulation flow passage 20a is a flow passage through which the high-temperature side coolant circulates.

The high-temperature side radiator 23 is disposed in a radiator flow passage 20b. The radiator flow passage 20b is a flow passage through which the high-temperature side coolant flows in parallel with the heater core 22.

A high-temperature side three-way valve 24 is disposed at a connection portion between the high-temperature side circulation flow passage 20a and the radiator flow passage 20b. The high-temperature side three-way valve 24 is a solenoid valve that switches the coolant flow. Specifically, the high-temperature side three-way valve 24 switches between a state of causing the coolant flowing out of the high-temperature side pump 21 to flow through the heater core 22 and a state of causing this coolant not to flow therethrough, while switching between a state of causing the coolant flowing out of the high-temperature side pump 21 to flow to the radiator flow passage 20b and a state of causing this coolant not to flow therethrough. The operation of the high-temperature side three-way valve 24 is controlled by the controller 60. The high-temperature side three-way valve 24 is a high-temperature switching portion that switches the flow of the coolant in the high-temperature coolant circuit 20.

The high-temperature side three-way valve 24 may also be a thermostat. The thermostat is a coolant thermo-sensitive valve that includes a mechanical mechanism for displacing a valve body with a thermowax having a variable volume depending on its temperature to open and close the coolant flow passage.

In the low-temperature coolant circuit 30, a low-temperature side pump 31, the coolant cooling evaporator 17, a low-temperature side radiator 32, and a battery 33 are disposed.

The low-temperature side pump 31 is a heat medium pump that draws and discharges the coolant. The low-temperature side pump 31 is an electric pump. The low-temperature side radiator 32 is a low-temperature heat medium-outside air heat exchanger that exchanges heat between the coolant in the low-temperature coolant circuit 30 and the outside air. The low-temperature side radiator 32 is a heat exchanging portion where the coolant in the low-temperature coolant circuit 30 exchanges heat.

The high-temperature side radiator 23 and the low-temperature side radiator 32 are arranged in series in this order in the flow direction of the outside air. An exterior blower 41 blows the outside air to the high-temperature side radiator 23 and the low-temperature side radiator 32.

The exterior blower 41 is an outside air blowing portion that blows the outside air toward the high-temperature side radiator 23 and the low-temperature side radiator 32. The exterior blower 41 is an electric blower that drives a fan with an electric motor. The high-temperature side radiator 23, the low-temperature side radiator 32, and the exterior blower 41 are disposed at the forefront of the vehicle. Therefore, when the vehicle is running, the air caused by the running of the vehicle can hit the high-temperature side radiator 23 and the low-temperature side radiator 32.

The battery 33 is a vehicle-mounted device that is mounted on the vehicle, and is also a heat generating device that generates heat during the operation of the vehicle. The battery 33 is a heat exchanging portion where the coolant in the low-temperature coolant circuit 30 exchanges heat. The battery 33 dissipates waste heat generated during the operation of the vehicle, into the coolant in the low-temperature coolant circuit 30. In other words, the battery 33 supplies heat to the coolant in the low-temperature coolant circuit 30.

Not only the battery 33, but also the heat generating devices, such as an inverter, a charger, and a motor generator, may be disposed in the low-temperature coolant circuit 30.

The inverter is a power converter that converts DC power supplied from the battery 33 into AC power and outputs the AC power to the motor generator. The charger is a charging device that charges the battery 33. The motor generator uses the electric power output from the inverter to generate a driving force for running and also to generate regenerative electric power during deceleration of the vehicle or when it descends a slope.

The low-temperature side pump 31, the coolant cooling evaporator 17, and the battery 33 are disposed in a low-temperature side circulation flow passage 30a. The low-temperature side circulation flow passage 30a is a flow passage through which the low-temperature side coolant circulates.

The low-temperature side radiator 32 is disposed in a low-temperature side radiator flow passage 30b. The low-temperature side radiator flow passage 30b is a flow passage through which the low-pressure side coolant flows.

A low-temperature side three-way valve 38 is disposed in a connection portion between the low-temperature side circulation flow passage 30a and the low-temperature side radiator 32. The low-temperature side three-way valve 38 is a solenoid valve that switches the coolant flow. Specifically, the low-temperature side three-way valve 38 switches between a state of causing the coolant flowing out of the coolant cooling evaporator 17 to flow through the battery 33 and a state of causing this coolant not to flow therethrough, while switching between a state of causing the coolant flowing out of the coolant cooling evaporator 17 to flow through the low-temperature side radiator flow passage 30b and a state of causing this coolant not to flow therethrough. The operation of the low-temperature side three-way valve 38 is controlled by the controller 60.

The low-temperature side three-way valve 38 is a low-temperature switching portion that switches the flow of the coolant in the low-temperature coolant circuit 30. The low-temperature side three-way valve 38 is a low-temperature side circulation switching portion that switches between a state in which the coolant circulates between the battery 33 and the low-temperature side radiator 32 and a state in which the coolant does not circulate between the battery 33 and the low-temperature side radiator 32.

The high-temperature coolant circuit 20 and the low-temperature coolant circuit 30 are communicated with each other by an upstream-side communication flow passage 45 and a downstream-side communication flow passage 46. The upstream-side communication flow passage 45 and the downstream-side communication flow passage 46 are coolant flow passages through which the coolant flows. The upstream-side communication flow passage 45 and the downstream-side communication flow passage 46 are heat transfer portions that transfer heat from the high-temperature coolant circuit 20 to the low-temperature coolant circuit 30 such that the coolant dissipates heat in at least one of the battery 33 or the low-temperature side radiator 32.

The upstream-side communication flow passage 45 connects a portion of the high-temperature coolant circuit 20 on an outlet side of the heater core 22 and on an inlet side of the condenser 12 with a portion of the low-temperature coolant circuit 30 on the outlet side of the coolant cooling evaporator 17 and on the inlet side of the battery 33.

The downstream-side communication flow passage 46 connects a portion of the high-temperature coolant circuit 20 on the outlet side of the condenser 12 and on the suction side of the high-temperature side pump 21 with a portion of the low-temperature coolant circuit 30 on the discharge side of the low-temperature side pump 31 and on the inlet side of the coolant cooling evaporator 17.

An upstream-side three-way valve 47 is disposed in the connection portion between the upstream-side communication flow passage 45 and the high-temperature coolant circuit 20. The upstream-side three-way valve 47 is an opening/closing portion that opens and closes the upstream-side communication flow passage 45. The upstream-side three-way valve 47 is a solenoid valve that switches between a state of connecting the high-temperature coolant circuit 20 with the upstream-side communication flow passage 45 and a state of not connecting the high-temperature coolant circuit 20 with the upstream-side communication flow passage 45. The operation of the upstream-side three-way valve 47 is controlled by the controller 60.

A downstream-side three-way valve 48 is disposed at a connection portion between the downstream-side communication flow passage 46 and the low-temperature coolant circuit 30. The downstream-side three-way valve 48 is an opening/closing portion that opens or closes the downstream-side communication flow passage 46. The downstream-side three-way valve 48 is a solenoid valve that switches between a state of connecting the low-temperature coolant circuit 30 with the downstream-side communication flow passage 46 and a state of not connecting the low-temperature coolant circuit 30 with the downstream-side communication flow passage 46. The operation of the downstream-side three-way valve 48 is controlled by the controller 60.

The upstream-side three-way valve 47 and the downstream-side three-way valve 48 are circuit switching portions that switch the connection state between the high-temperature coolant circuit 20 and the low-temperature coolant circuit 30.

A communication pump 49 is disposed in the upstream-side communication flow passage 45. The communication pump 49 is a heat medium pump that draws and discharges the coolant. The communication pump 49 is an electric pump.

Figure 2:
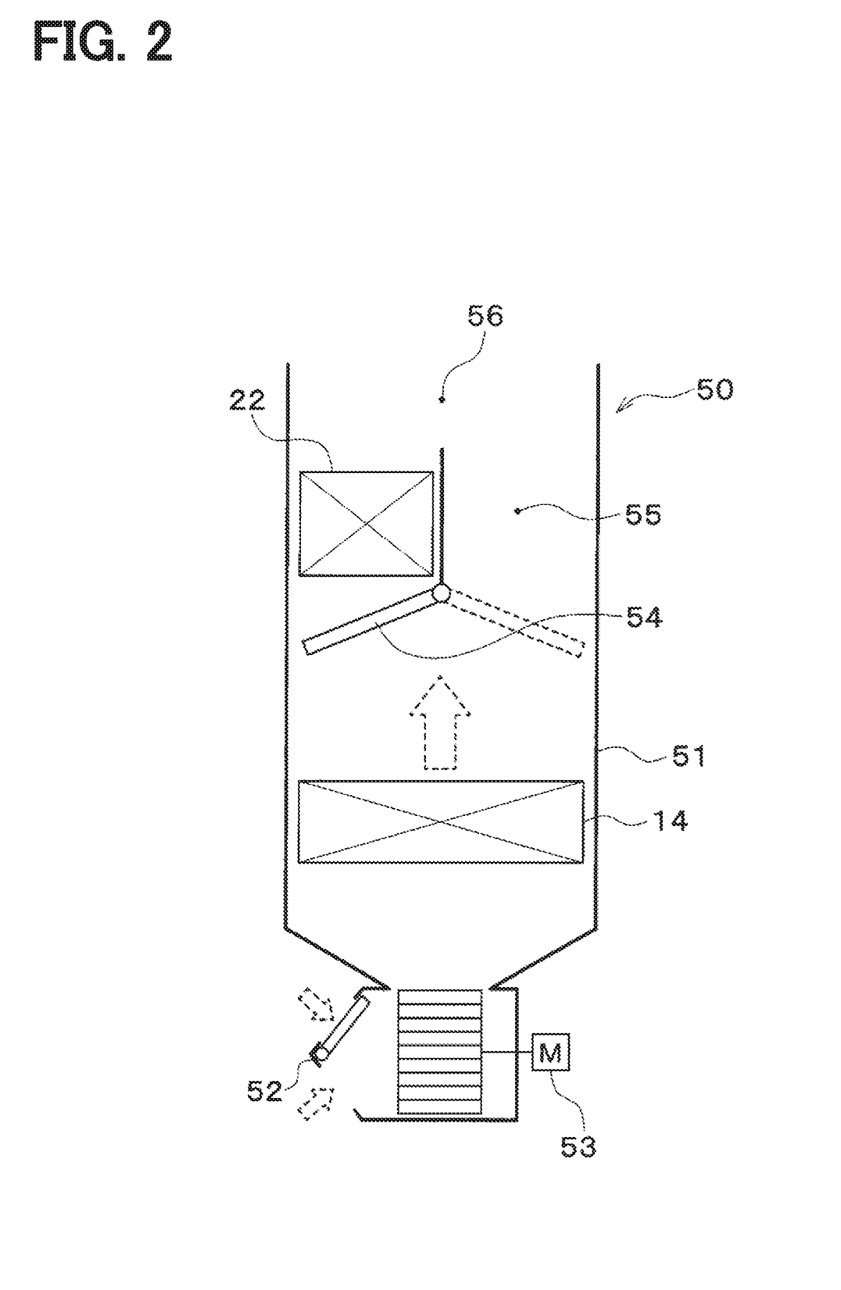
FIG. 2 is an entire configuration diagram of an interior air conditioning unit in the first embodiment.

The air cooling evaporator 14 and the heater core 22 are accommodated in an air conditioning casing 51 shown in FIG. 2. The air conditioning casing 51 is a casing of an interior air conditioning unit 50. The interior air conditioning unit 50 is disposed inside an instrument panel (not shown) at the front of the interior of the vehicle cabin. The air conditioning casing 51 is an air passage forming member that forms an air passage.

The heater core 22 is disposed on the air flow downstream side of the air cooling evaporator 14 in the air passage within the air conditioning casing 51. An inside/outside air switching box 52 and an interior air blower 53 are disposed in the air conditioning casing 51. The inside/outside air switching box 52 is an inside/outside air switching portion that switches between the inside air and the outside air and introduces the switched air to the air passage in the air conditioning casing 51. The interior air blower 53 draws and blows the inside air and the outside air introduced into the air passage of the air conditioning casing 51 through the inside/outside air switching box 52.

An air mix door 54 is disposed between the air cooling evaporator 14 and the heater core 22 in the air passage within the air conditioning casing 51. The air mix door 54 adjusts the ratio of the air volume between cold air flowing into the heater core 22 and cold air flowing through a cold air bypass passage 55 in the cold air having passed through the air cooling evaporator 14.

The cold air bypass passage 55 is an air passage through which the cold air having passed through the air cooling evaporator 14 flows to bypass the heater core 22.

The air mix door 54 is a rotary door that has a rotary shaft rotatably supported with respect to the air conditioning casing 51 and a door base coupled to the rotary shaft. The temperature of the conditioned air blown from the air conditioning casing 51 into the vehicle cabin can be regulated to a desired temperature by adjusting an opening degree position of the air mix door 54.

The rotary shaft of the air mix door 54 is driven by a servo motor. The operation of the servo motor is controlled by the controller 60.

The air mix door 54 may be a sliding door that slides in a direction substantially orthogonal to the air flow. The sliding door may be a plate-shaped door formed of a rigid body or a film door formed of a flexible film material.

The conditioned air that has its temperature regulated by the air mix door 54 is blown from an air outlet 56 formed in the air conditioning casing 51, into the interior of the vehicle cabin.

Figure 3:
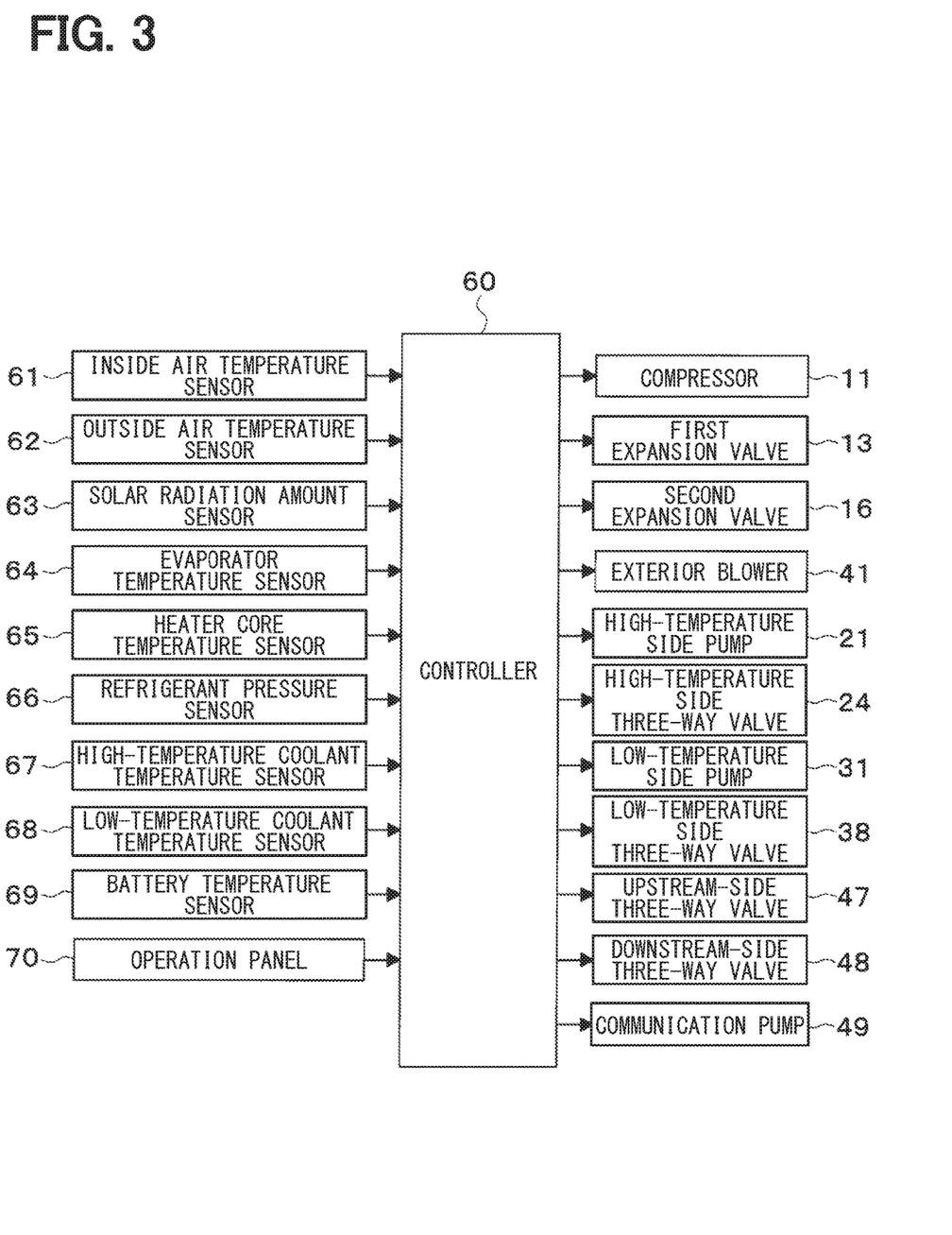
FIG. 3 is a block diagram showing an electric control unit of an air conditioner in the first embodiment.

The controller 60 shown in FIG. 3 is constituted of a known microcomputer, including a CPU, a ROM, and a RAM, and a peripheral circuit thereof. The controller 6 performs various computations and processing based on control programs stored in the ROM. Various control target devices are connected to the output side of the controller 60. The controller 60 is a control unit that controls the operations of various control target devices.

The control target devices controlled by the controller 60 include the compressor 11, the first expansion valve 13, the second expansion valve 16, the exterior blower 41, the high-temperature side pump 21, the high-temperature side three-way valve 24, the low-temperature side pump 31, the low-temperature side three-way valve 38, and the like.

The software and hardware for controlling the electric motor of the compressor 11 in the controller 60 constitute a refrigerant discharge capacity control unit. The software and hardware for controlling the first expansion valve 13 in the controller 60 constitute a first throttle control unit. The software and hardware for controlling the second expansion valve 16 in the controller 60 constitute a second throttle control unit.

The software and hardware for controlling the exterior blower 41 in the controller 60 constitute an outside air blowing capacity control unit.

The software and hardware for controlling the high-temperature side pump 21 in the controller 60 constitute a high-temperature heat medium flow-rate control unit. The software and hardware for controlling the high-temperature side three-way valve 24 in the controller 60 constitute a high-temperature heat medium flow control unit.

The software and hardware for controlling the low-temperature side pump 31 in the controller 60 constitute a low-temperature heat medium flow-rate control unit. The software and hardware for controlling the low-temperature side three-way valve 38 in the controller 60 constitute a low-temperature heat medium flow control unit.

A group of various control sensors is connected to the input side of the controller 60. The control sensor group includes an inside air temperature sensor 61, an outside air temperature sensor 62, a solar radiation amount sensor 63, an evaporator temperature sensor 64, a heater core temperature sensor 65, a refrigerant pressure sensor 66, a high-temperature coolant temperature sensor 67, a low-temperature coolant temperature sensor 68, a battery temperature sensor 69, and the like.

The inside air temperature sensor 61 detects a vehicle interior temperature Tr. The outside air temperature sensor 62 detects an outside air temperature Tam. The solar radiation amount sensor 63 detects a solar radiation amount Ts in the interior of the vehicle cabin.

The evaporator temperature sensor 64 is a temperature detector that detects the temperature of the coolant cooling evaporator 17. The evaporator temperature sensor 64 is, for example, a fin thermistor that detects the temperature of the heat exchange fin of the coolant cooling evaporator 17, a refrigerant temperature sensor that detects the temperature of the refrigerant flowing through the coolant cooling evaporator 17, or the like.

The heater core temperature sensor 65 is a temperature detector that detects the temperature of the heater core 22. The heater core temperature sensor 65 is, for example, a fin thermistor that detects the temperature of a heat exchange fin of the heater core 22, a refrigerant temperature sensor that detects the temperature of the coolant flowing through the heater core 22, an air temperature sensor that detects the temperature of air flowing out of the heater core 22, or the like.

The refrigerant pressure sensor 66 is a refrigerant pressure detector that detects the pressure of the refrigerant discharged from the compressor 11. Instead of the refrigerant pressure sensor 66, a refrigerant temperature sensor may be connected to an input side of the controller 60. The refrigerant temperature sensor is a refrigerant pressure detector that detects the temperature of the refrigerant discharged from the compressor 11. The controller 60 may estimate the pressure of the refrigerant based on the temperature of the refrigerant.

The high-temperature coolant temperature sensor 67 is a high-temperature heat medium temperature detector that detects the temperature of the coolant in the high-temperature coolant circuit 20. For example, the high-temperature coolant temperature sensor 67 detects the temperature of the coolant in the condenser 12.

The low-temperature coolant temperature sensor 68 is a low-temperature heat medium temperature detector that detects the temperature of the coolant in the low-temperature coolant circuit 30. For example, the low-temperature coolant temperature sensor 68 detects the temperature of the coolant in the coolant cooling evaporator 17.

The battery temperature sensor 69 is a battery temperature detector that detects the temperature of the battery 33. For example, the battery temperature sensor 69 detects the temperature of each cell of the battery 33.

Various operation switches (not shown) are connected to the input side of the controller 60. These respective operation switches are provided on an operation panel 70 and manipulated by an occupant. The operation panel 70 is disposed in the vicinity of an instrument panel at the front of the interior of the vehicle cabin. Operation signals from the various operation switches are input to the controller 60.

Various operation switches include an air conditioner switch, a temperature setting switch, and the like. The air conditioning switch sets whether or not the cooling of the air is performed by the interior air conditioning unit 50. The temperature setting switch is to set a preset temperature of the interior of the vehicle cabin.

Next, the operation of the refrigeration cycle device with the above-mentioned configuration will be described. The controller 60 switches an operation mode to either the air-cooling mode or the air-heating mode based on a target air outlet temperature TAO and the like when the air conditioner switch is turned on.

The target air outlet temperature TAO is a target temperature of the blowing air that is blown toward the interior of the vehicle cabin. The controller 60 calculates the target air outlet temperature TAO based on the following formula:

$$TAO = Kset \times Tset - Kr \times Tr - Kam \times Tam - Ks \times Ts + C$$

where Tset is a vehicle interior preset temperature set by the temperature setting switch of the operation panel 70; Tr is an inside air temperature detected by the inside air temperature sensor 61; Tam is an outside air temperature detected by the outside air temperature sensor 62, and Ts is a solar radiation amount detected by the solar radiation amount sensor 63. Kset, Kr, Kam, and Ks are control gains, and C is a constants for correction.

Next, the operations in the air-cooling mode and the air-heating mode will be described.

(1) Air-Cooling Mode

In the air-cooling mode, the controller 60 brings the first on-off valve 18 into a valve opened state. The controller 60 brings the upstream-side three-way valve 47 and the downstream-side three-way valve 48 into a valve closed state.

The controller 60 determines the operating states (control signals to be outputted to the various control target devices) of the various control target devices connected to the controller 60 based on the target air outlet temperature TAO, detection signals from the sensor group, and the like.

A control signal to be output to the servo motor of the air mix door 54 is determined such that the air mix door 54 is located in the position indicated by a solid line of FIG. 2 to close the air passage in the heater core 22, thereby causing the whole ventilation air having passed through the air cooling evaporator 14 to flow while bypassing the air passage in the heater core 22.

In the air-cooling mode, the controller 60 operates the compressor 11 and the high-temperature side pump 21. In the air-cooling mode, the controller 60 controls the high-temperature side three-way valve 24 to open the radiator flow passage 20b. Thus, as indicated by a broken arrow in FIG. 1, the coolant in the high-temperature coolant circuit 20 circulates to the high-temperature side radiator 23, causing the heat to be dissipated from the coolant into the outside air in the radiator 23.

At this time, the air mix door 54 closes the air passage in the heater core 22, and consequently the heater core 22 hardly dissipates heat from the coolant into the air.

In the refrigeration cycle device 10 during the air-cooling mode, the refrigerant flows as indicated by the broken arrow in FIG. 1, and the state of the refrigerant circulating in the cycle changes as follows.

That is, the high-pressure refrigerant discharged from the compressor 11 flows into the condenser 12. The refrigerant flowing into the condenser 12 dissipates heat into the coolant in the high-temperature coolant circuit 20. Thus, the refrigerant is cooled and condensed in the condenser 12.

The refrigerant flowing out of the condenser 12 flows into the first expansion valve 13 and is then decompressed and expanded into a low-pressure refrigerant by the first expansion valve 13. The low-pressure refrigerant decompressed by the first expansion valve 13 flows into the air cooling evaporator 14 and evaporates by absorbing heat from the air to be blown into the interior of the vehicle cabin. Thus, the air to be blown into the interior of the vehicle cabin is cooled.

Then, the refrigerant flowing out of the air cooling evaporator 14 flows to the suction side of the compressor 11 and is compressed by the compressor 11 again.

As mentioned above, in the air-cooling mode, the low-pressure refrigerant absorbs heat from the air in the air cooling evaporator 14, and then the cooled air can be blown into the interior of the vehicle cabin. Thus, the cooling of the interior of the vehicle cabin can be achieved.

When the battery 33 needs to be cooled in the air-cooling mode, the controller 60 brings the second on-off valve 19 into the valve closed state and operates the low-temperature side pump 31.

Thus, as indicated by a solid arrow in FIG. 1, the refrigerant flowing out of the condenser 12 flows into the second expansion valve 16, and is then decompressed and expanded by the second expansion valve 16 into the low-pressure refrigerant. The low-pressure refrigerant decompressed by the second expansion valve 16 flows into the coolant cooling evaporator 17 and evaporates by absorbing heat from the coolant in the low-temperature coolant circuit 30. Thus, the coolant in the low-temperature coolant circuit 30 is cooled.

When the battery 33 needs to be cooled, the controller 60 controls the low-temperature side three-way valve 38 to cause the coolant in the low-temperature coolant circuit 30 to flow through the battery 33. Thus, the coolant in the low-temperature coolant circuit 30 circulates to the battery 33 as indicated by a two-dot chain line arrow in FIG. 1 to cool the battery 33.

(2) Air-Heating Mode

In the air-heating mode, the controller 60 brings the first on-off valve 18 into a valve closed state and the second on-off valve 19 into a valve opened state. The controller 60 brings the upstream-side three-way valve 47 and the downstream-side three-way valve 48 into a valve closed state.

The controller 60 determines the operating states (control signals to be outputted to the various control target devices) of the various control target devices connected to the controller 60 based on the target air outlet temperature TAO, detection signals from the sensor group, and the like.

A control signal to be output to the servo motor of the air mix door 54 is determined such that the air mix door 54 is located in the position indicated by a broken line of FIG. 2 to fully open the air passage in the heater core 22, thus causing the whole ventilation air having passed through the air cooling evaporator 14 to pass through the air passage in the heater core 22.

In the air-heating mode, the controller 60 operates the compressor 11, the high-temperature side pump 21, and the low-temperature side pump 31. In the air-heating mode, the high-temperature side three-way valve 24 is controlled to close the radiator flow passage 20b. Thus, as indicated by a solid arrow in FIG. 1, the coolant in the high-temperature coolant circuit 20 circulates to the heater core 22, thereby dissipating heat in the heater core 22 from the coolant into the air to be blown into the interior of the vehicle cabin.

In the air-heating mode, the operation of the low-temperature side three-way valve 38 is controlled to open the low-temperature side radiator flow passage 30b. Thus, as indicated by the solid arrow in FIG. 1, the coolant in the low-temperature coolant circuit 30 circulates to the low-temperature side radiator 32.

In the refrigeration cycle device 10 during the air-heating mode, the refrigerant flows as indicated by the solid arrow in FIG. 1, and the state of the refrigerant circulating in the cycle changes as follows.

That is, the high-pressure refrigerant discharged from the compressor 11 flows into the condenser 12 and dissipates heat by exchanging heat with the coolant in the high-temperature coolant circuit 20. Thus, the coolant in the high-temperature coolant circuit 20 is heated.

The refrigerant flowing out of the condenser 12 flows into and is decompressed by the second expansion valve 16 into the low-pressure refrigerant. The low-pressure refrigerant decompressed by the second expansion valve 16 flows into the coolant cooling evaporator 17 and evaporates by absorbing heat from the coolant in the low-temperature coolant circuit 30.

Then, the refrigerant flowing out of the coolant cooling evaporator 17 flows to the suction side of the compressor 11 and is then compressed by the compressor 11 again.

As mentioned above, in the air-heating mode, heat contained in the high-pressure refrigerant which is discharged from the compressor 11 is dissipated at the condenser 12 into the coolant in the high-temperature coolant circuit 20, and then the heat contained of the coolant in the high-temperature coolant circuit 20 is dissipated into the air at the heater core 22, so that the air heated by the heater core 22 can be blown into the interior of the vehicle cabin. Thus, the heating of the interior of the vehicle cabin can be achieved.

Since the coolant in the low-temperature coolant circuit 30 circulates through the low-temperature side radiator 32, the heat is absorbed from the outside air into the coolant of the low-temperature coolant circuit 30, so that the heat can be absorbed from the coolant in the low-temperature coolant circuit 30 into the low-pressure refrigerant in the coolant cooling evaporator 17. Therefore, the heat of the outside air can be used to perform air-heating of the interior of the vehicle.

In the air-heating mode, as indicated by the two-dot chain line arrow in FIG. 1, by circulating the coolant in the low-temperature coolant circuit 30 also to the battery 33, waste heat of the battery 33 can be absorbed in the coolant of the low-temperature coolant circuit 30, causing the coolant cooling evaporator 17 to absorb heat from the coolant in the low-temperature coolant circuit 30 into the low-pressure refrigerant. Therefore, the waste heat of the battery 33 can be used to perform air-heating of the interior of the vehicle cabin.

(3) Cooling Mode

The controller 60 executes the cooling mode according to the temperature of the battery 33 when the air conditioner switch is turned off.

In the cooling mode, the controller 60 brings the first on-off valve 18 into the valve closed state. The controller 60 brings the upstream-side three-way valve 47 and the downstream-side three-way valve 48 into a valve closed state.

The controller 60 determines the operating state of each of various control target devices connected to the controller 60 (a control signal output to each of various control target devices), based on the detection signals from the sensor group and the like.

In the cooling mode, the controller 60 operates the compressor 11 and the high-temperature side pump 21. In the cooling mode, the controller 60 controls the high-temperature side three-way valve 24 to open the radiator flow passage 20b. Thus, as indicated by the solid arrow in FIG. 1, the coolant in the high-temperature coolant circuit 20 circulates to the high-temperature side radiator 23, causing the heat to be dissipated from the coolant into the outside air in the radiator 23.

In the refrigeration cycle device 10 during the cooling mode, the refrigerant flows as indicated by the solid arrow in FIG. 1, and the state of the refrigerant circulating in the cycle changes as follows.

That is, the high-pressure refrigerant discharged from the compressor 11 flows into the condenser 12. The refrigerant flowing into the condenser 12 dissipates heat into the coolant in the high-temperature coolant circuit 20. Thus, the refrigerant is cooled and condensed in the condenser 12.

The refrigerant flowing out of the condenser 12 flows into and is decompressed by the second expansion valve 16 into the low-pressure refrigerant. The low-pressure refrigerant decompressed by the second expansion valve 16 flows into the coolant cooling evaporator 17 and evaporates by absorbing heat from the coolant in the low-temperature coolant circuit 30.

Then, the refrigerant flowing out of the coolant cooling evaporator 17 flows to the suction side of the compressor 11 and is then compressed by the compressor 11 again.

During the cooling mode, the controller 60 controls the low-temperature side three-way valve 38 such that the coolant in the low-temperature coolant circuit 30 flows through the battery 33. Thus, the coolant in the low-temperature coolant circuit 30 circulates to the battery 33 as indicated by the two-dot chain line arrow in FIG. 1 to cool the battery 33.

As mentioned above, in the cooling mode, the heat from the coolant is absorbed in the low-pressure refrigerant at the air cooling evaporator 14, so that the cooled coolant can circulate to the battery 33. Thus, the cooling of the battery 33 can be achieved.

(4) Battery Heating Mode

The controller 60 executes a battery heating mode to heat the battery 33 when the battery 33 is desired to be heated because its temperature is lower than the lower limit of temperature, such as upon the start-up of the vehicle.

In the battery heating mode, the controller 60 brings the first on-off valve 18 into the valve closed state and the second on-off valve 19 into the valve opened state. The controller 60 brings the upstream-side three-way valve 47 and the downstream-side three-way valve 48 into the valve opened state.

The controller 60 determines the operating state of each of various control target devices connected to the controller 60 (a control signal output to each of various control target devices), based on the detection signals from the sensor group and the like.

In the battery heating mode, the controller 60 operates the compressor 11 and the communication pump 49.

Figure 4:
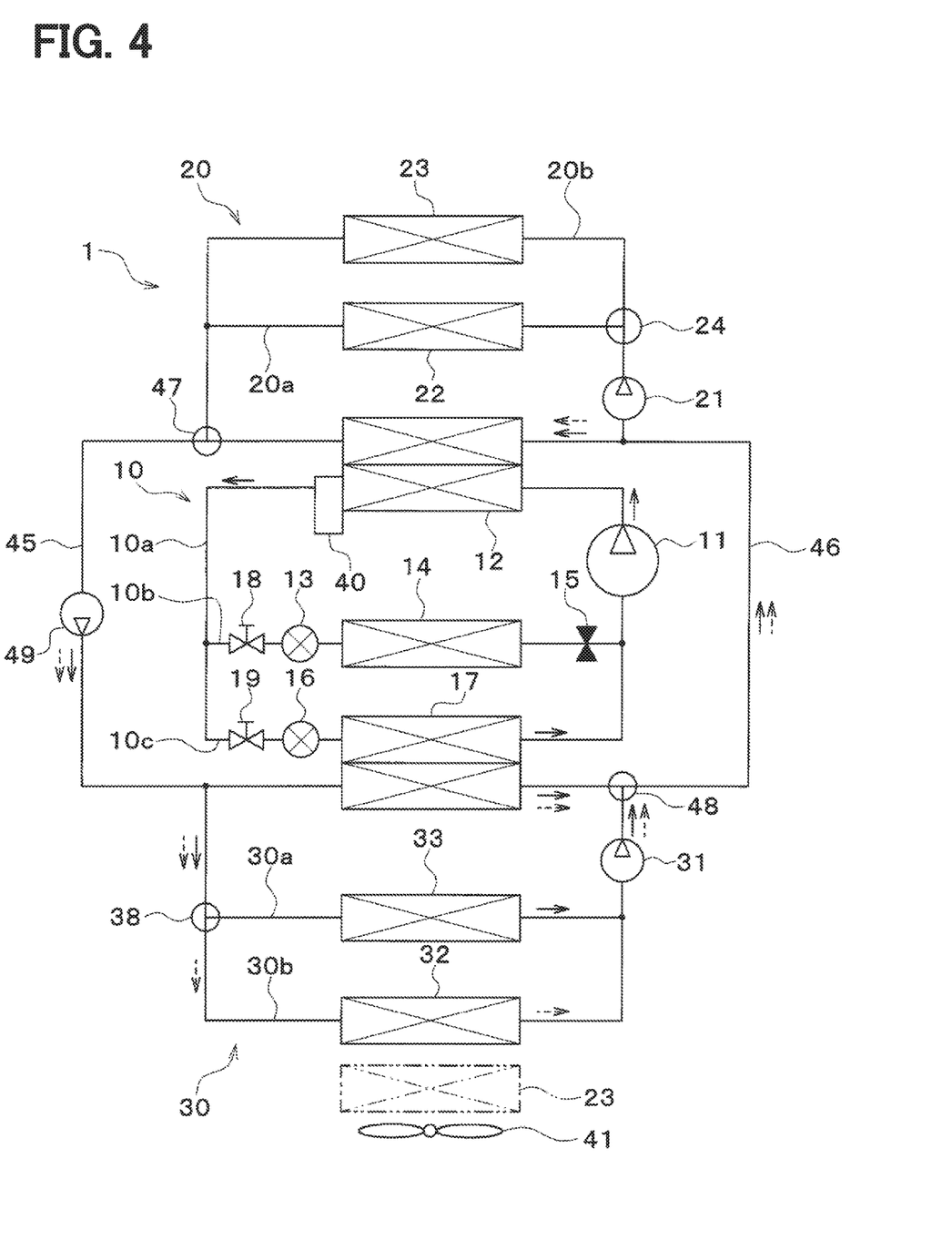
FIG. 4 is a configuration diagram showing coolant flows in a battery heating mode and a defrosting mode of the first embodiment.

In the refrigeration cycle device 10 during the battery heating mode, the refrigerant flows as indicated by a solid arrow in FIG. 4, and the state of the refrigerant circulating in the cycle changes as follows.

That is, the high-pressure refrigerant discharged from the compressor 11 flows into the condenser 12. The refrigerant flowing into the condenser 12 dissipates heat into the coolant in the high-temperature coolant circuit 20. Thus, the refrigerant is cooled and condensed in the condenser 12.

The refrigerant flowing out of the condenser 12 flows into and is decompressed by the second expansion valve 16 into the low-pressure refrigerant. The low-pressure refrigerant decompressed by the second expansion valve 16 flows into the coolant cooling evaporator 17 and evaporates by absorbing heat from the coolant in the low-temperature coolant circuit 30.

Then, the refrigerant flowing out of the coolant cooling evaporator 17 flows to the suction side of the compressor 11 and is then compressed by the compressor 11 again.

During the battery heating mode, the coolant in the high-temperature coolant circuit 20 circulates info the low-temperature coolant circuit 30 via the upstream-side communication flow passage 45 and the downstream-side communication flow passage 46.

During the battery heating mode, the controller 60 controls the low-temperature side three-way valve 38 such that the coolant in the high-temperature coolant circuit 20 does not flow through the radiator flow passage 20b. The controller 60 controls the low-temperature side three-way valve 38 during the battery heating mode such that the coolant in the low-temperature coolant circuit 30 flows through the battery 33. Thus, as indicated by a solid arrow in FIG. 4, the coolant in the high-temperature coolant circuit 20 flows through the battery 33 and dissipates heat into the battery 33. Therefore, the battery 33 is heated.

As mentioned above, in the battery heating mode, the heat from the high-pressure refrigerant is dissipated into the coolant in the high-temperature coolant circuit 20, so that the heated coolant can circulate to the battery 33. Thus, the heating of the battery 33 can be achieved.

In the battery heating mode, the coolant in the high-temperature coolant circuit 20 flows to the heater core 22, and the air mix door 54 opens the air passage of the heater core 22, making it possible to perform air-heating while heating the battery 33.

(5) Defrosting Mode

The controller 60 executes a defrosting mode to defrost the low-temperature side radiator 32 when frost is formed on the low-temperature side radiator 32.

In the defrosting mode, the controller 60 brings the first on-off valve 18 into the valve closed state and the second on-off valve 19 into the valve opened state. The controller 60 brings the upstream-side three-way valve 47 and the downstream-side three-way valve 48 into the valve opened state.

The controller 60 determines the operating state of each of various control target devices connected to the controller 60 (a control signal output to each of various control target devices), based on the detection signals from the sensor group and the like.

In the defrosting mode, the controller 60 operates the compressor 11 and the communication pump 49.

In the refrigeration cycle device 10 during the defrosting, the refrigerant flows as indicated by a solid arrow in FIG. 4, and the state of the refrigerant circulating in the cycle changes as follows.

That is, the high-pressure refrigerant discharged from the compressor 11 flows into the condenser 12. The refrigerant flowing into the condenser 12 dissipates heat into the coolant in the high-temperature coolant circuit 20. Thus, the refrigerant is cooled and condensed in the condenser 12.

The refrigerant flowing out of the condenser 12 flows into and is decompressed by the second expansion valve 16 into the low-pressure refrigerant. The low-pressure refrigerant decompressed by the second expansion valve 16 flows into the coolant cooling evaporator 17 and evaporates by absorbing heat from the coolant in the low-temperature coolant circuit 30.

Then, the refrigerant flowing out of the coolant cooling evaporator 17 flows to the suction side of the compressor 11 and is then compressed by the compressor 11 again.

During the defrosting mode, the coolant in the high-temperature coolant circuit 20 circulates into the low-temperature coolant circuit 30 via the upstream-side communication flow passage 45 and the downstream-side communication flow passage 46.

The controller 60 controls the low-temperature side three-way valve 38 during the defrosting mode such that the coolant in the high-temperature coolant circuit 20 flows through the radiator flow passage 20b. The controller 60 controls the low-temperature side three-way valve 38 during the defrosting mode such that the coolant in the low-temperature coolant circuit 30 flows through the low-temperature side radiator 32. Thus, as indicated by a broken arrow in FIG. 4, the coolant in the high-temperature coolant circuit 20 flows through the low-temperature side radiator 32 and dissipates its heat in the low-temperature side radiator 32. Thus, the low-temperature side radiator 32 is defrosted.

As mentioned above, in the defrosting mode, the heat from the high-pressure refrigerant is dissipated into the coolant in the high-temperature coolant circuit 20, so that the heated coolant can circulate to the low-temperature side radiator 32. Thus, the defrosting of the low-temperature side radiator 32 can be achieved.

In the defrosting mode, the coolant in the high-temperature coolant circuit 20 flows to the heater core 22, and the air mix door 54 opens the air passage of the heater core 22, making it possible to perform air-heating while defrosting the low-temperature side radiator 32.

The battery heating mode and the defrosting mode can also be simultaneously executed.

In the present embodiment, the upstream-side communication flow passage 45 and the downstream-side communication flow passage 46 transfer the heat from the high-temperature coolant circuit 20 to the low-temperature coolant circuit 30 such that the coolant dissipates heat into at least one of the battery 33 or the low-temperature side radiator 32.

Thus, since the coolant can dissipate heat at the battery 33 and the low-temperature side radiator 32 by providing the upstream-side communication flow passage 45 and the downstream side communication flow passage 46, the battery 33 and the low-temperature side radiator 32 can be heated with a simple configuration.

Because a conventional hot-gas operation depends only on a refrigerant pressure (in other words, refrigerant density) on the suction side of the compressor, there is a problem that no means is provided for improving the heating capacity of a refrigeration cycle except for increasing the rotation number of the compressor.

However, in the present embodiment, the battery 33 and the low-temperature side radiator 32 are heated not by the hot-gas operation but by a normal operation of the refrigeration cycle. Thus, the heating capacity of the refrigeration cycle can be improved easily, and the battery 33 and the low-temperature side radiator 32 can be heated efficiently.

In the present embodiment, at least part of the coolant flowing from the high-temperature coolant circuit 20 into the low-temperature coolant circuit 30 via the upstream-side communication flow passage 45 flows through at least one of the battery 33 or the low-temperature side radiator 32 without passing through the low-temperature side evaporator 17 as a low-temperature side heat exchanger.

Thus, the coolant can efficiently dissipate heat in the battery 33 and the low-temperature side radiator 32.

In the present embodiment, after the temperature or pressure of the coolant in the high-temperature coolant circuit 20 is raised to a predetermined value or higher, the controller 60 preferably controls the upstream-side three-way valve 47 and the downstream-side three-way valve 48 so as to open the upstream-side communication flow passage 45 and the downstream-side communication flow passage 46.

Thus, when heat is transferred between the high-temperature coolant circuit 20 and the low-temperature coolant circuit 30, a difference in the temperature between the high-temperature coolant circuit 20 and the low-temperature coolant circuit 30 can be increased to enlarge a difference between the high and low pressures in the refrigeration cycle, making it possible to increase the power of the compressor 11. As a result, the heating capacities of the battery 33 and the low-temperature side radiator 32 can be improved.

In the present embodiment, after controlling the low-temperature side three-way valve 38 to cause the coolant to circulate between the low-temperature side evaporator 17 and the low-temperature side radiator 32, the controller 60 preferably controls the upstream-side three-way valve 47 and the downstream-side three-way valve 48 so as to open the upstream-side communication flow passage 45 and the downstream-side communication flow passage 46.

Thus, after the heat is absorbed from the outside air to raise the temperature of the low-temperature side evaporator 17 as a low-temperature side heat exchanger, the heat can be transferred between the high-temperature coolant circuit 20 and the low-temperature coolant circuit 30.

In the present embodiment, after controlling the low-temperature side three-way valve 38 to cause the coolant to circulate between the low-temperature side evaporator 17 and at least one of the battery 33 or low-temperature side radiator 32, the controller 60 preferably controls the upstream-side three-way valve 47 and the downstream-side three-way valve 48 so as to open the upstream-side communication flow passage 45 and the downstream-side communication flow passage 46.

Thus, when the temperature of at least one of the battery 33 or the low-temperature side radiator 32 becomes lower than the outside air temperature due to the coolant cooled by the low-temperature side evaporator 17, the heat can be transferred between the high-temperature coolant circuit 20 and the low-temperature coolant circuit 30 after raising the temperature of at least one of the battery 33 or the low-temperature side radiator 32 to a temperature equivalent to the outside air temperature.

Therefore, after raising the temperature of the low-temperature side evaporator 17, the heat can be transferred between the high-temperature coolant circuit 20 and the low-temperature coolant circuit 30.

In the present embodiment, the receiver 40 is provided to separate the refrigerant flowing out of the high-temperature side heat exchanger (i.e., high-temperature side condenser) 12 into a gas-phase refrigerant and a liquid-phase refrigerant to cause the liquid-phase refrigerant to flow out to the second expansion valve 16 side, so that the refrigeration cycle can be made a receiver cycle to thereby improve its cooling performance.

In the present embodiment, each of the first on-off valve 18, the second on-off valve 19, the high-temperature side three-way valve 24, and the low-temperature side three-way valve 38 switches among the air-cooling mode, the air-heating mode, and the cooling mode.

The air-cooling mode is an operation mode in which the refrigerant absorbs heat from the air in the evaporator 14 and heat is dissipated from the refrigerant into the outside air in the high-temperature side radiator 23 (i.e., high-temperature side heat exchanger, or high-temperature side exterior unit). The air-heating mode is an operation mode in which heat is dissipated from the coolant into the air in the heater core 22 and the refrigerant absorbs heat from the outside air in the low-temperature side radiator 32 (i.e., low-temperature side heat exchanger, low low-temperature side exterior unit). The cooling mode is an operation mode in which the coolant absorbs heat in the battery 33 and the low-temperature side radiator 32.

Thus, the air-cooling and air-heating of the interior of the vehicle cabin and the cooling of the battery 33 and the low-temperature side radiator 32 can be performed as appropriate.

Second Embodiment

In the above-mentioned embodiment, the coolants flow in parallel with each other through the battery 33 and the coolant cooling evaporator 17 during the battery heating mode. On the other hand, in the present embodiment, as indicated by a solid arrow in FIG. 5, the coolants flow in series with each other through the battery 33 and the coolant cooling evaporator 17 during the battery heating mode.

Figure 5:
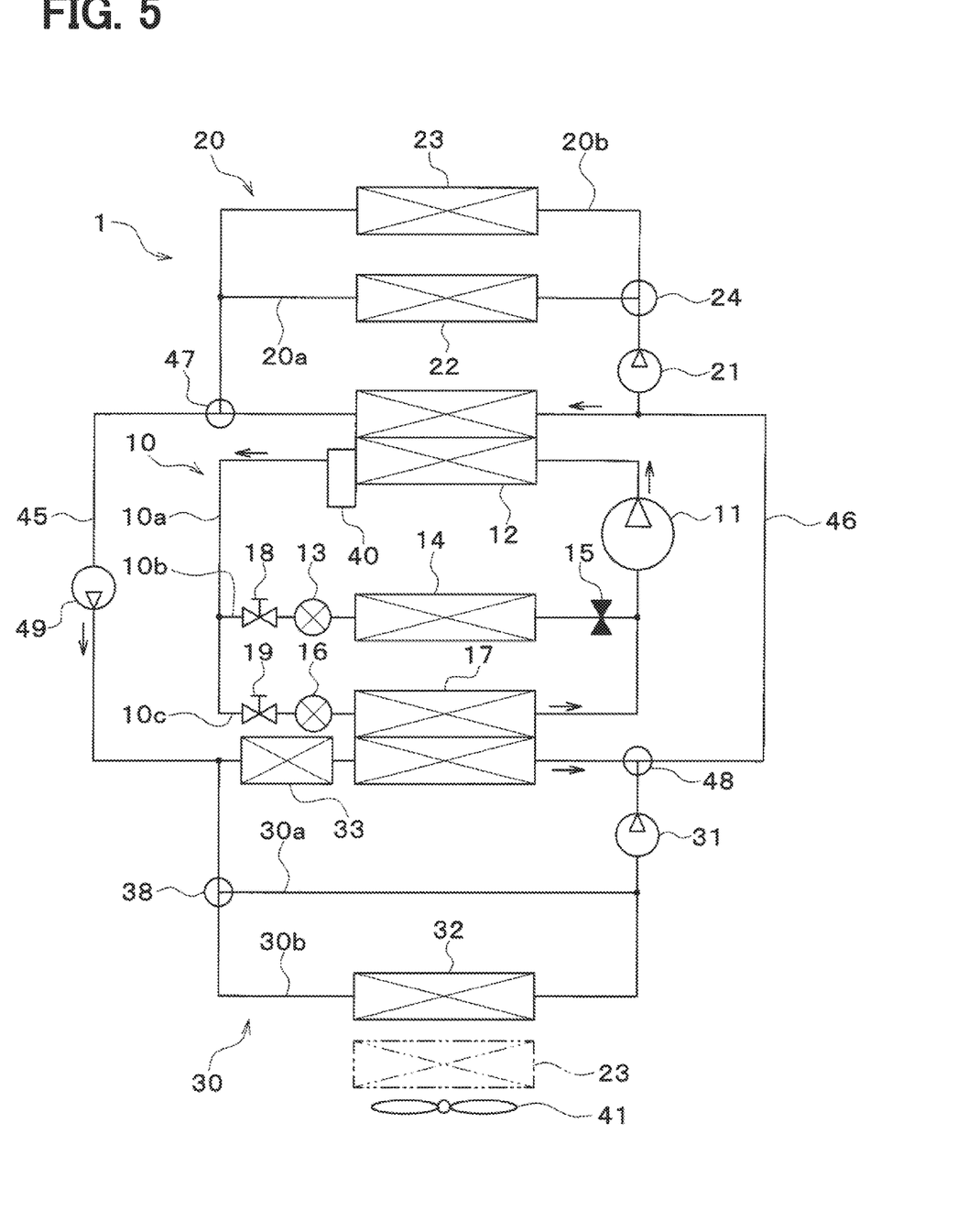
FIG. 5 is an entire configuration diagram of a refrigeration cycle device in a second embodiment.

Specifically, the battery 33 is disposed at a position between the coolant cooling evaporator 17 and a connection portion of the low-temperature side circulation flow passage 30a in the low-temperature coolant circuit 30, the connection portion being connected to the upstream-side communication flow passage 45.

Thus, during the battery heating mode, the coolant flowing into the low-temperature coolant circuit 30 from the high-temperature coolant circuit 20 via the upstream-side communication flow passage 45 flows in series through the battery 33 and the coolant cooling evaporator 17 in this order. Therefore, the battery 33 can be efficiently heated.

Third Embodiment

Figure 6:
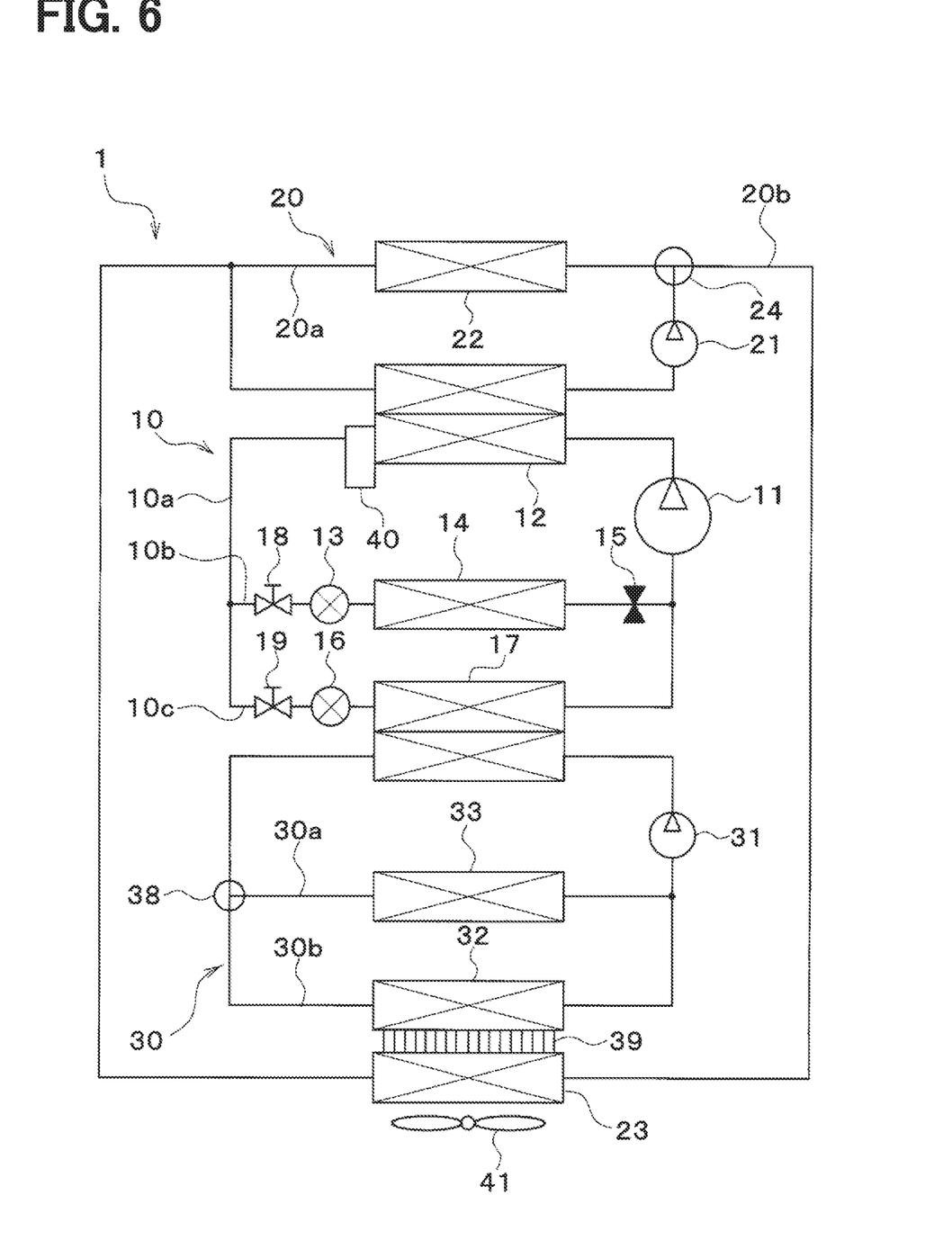
FIG. 6 is an entire configuration diagram of a refrigeration cycle device in a third embodiment.

In the above-mentioned embodiments, the high-temperature coolant circuit 20 and the low-temperature coolant circuit 30 are communicated with each other by the upstream-side communication flow passage 45 and the downstream-side communication flow passage 46, thus transferring the heat from the high-temperature coolant circuit 20 to the low-temperature coolant circuit 30. In the present embodiment, as shown in FIG. 6, the high-temperature side radiator 23 and the low-temperature side radiator 32 are joined to each other by a common fin 39, thereby transferring the heat from the high-temperature coolant circuit 20 to the low-temperature coolant circuit 30.

The common fin 39 is a heat exchange promoting member that promotes the heat exchange between the coolant and the air. The common fin 39 is a member made of metal (for example, aluminum).

The common fin 39 is a coupling portion that transfers the heat from the high-temperature side radiator 23 to the low-temperature side radiator 32 by coupling the high-temperature side radiator 23 and the low-temperature side radiator 32 together using the metal.

Thus, the defrosting of the low-temperature side radiator 32 can be achieved after the air-heating mode. In the air-heating mode, the coolant in the low-temperature coolant circuit 30 absorbs heat from the outside air in the low-temperature side radiator 32, resulting in frost formation on the low-temperature side radiator 32. When the vehicle stops after executing the air-heating mode, heat that remains in the coolant in the high-temperature coolant circuit 20 is used to defrost the low-temperature side radiator 32.

That is, since the high-temperature side radiator 23 and the low-temperature side radiator 32 are connected to enable heat transfer therebetween via the common fin 39, the heat of the coolant in the high-temperature coolant circuit 20 is transferred from the high-temperature side radiator 23 to the low-temperature side radiator 32.

Thus, the temperature of the low-temperature side radiator 32 is raised to defrost the frost formed on the surface of the low-temperature side radiator 32.

In the present embodiment, the fin 39 couples the high-temperature side radiator 23 and the low-temperature side radiator 32 using metal, thus transferring heat from the high-temperature side radiator 23 to the low-temperature side radiator 32.

Thus, the amount of heat transferred from the high-temperature side radiator 23 to the low-temperature side radiator 32 is determined according to a difference between high and low pressures of the refrigeration cycle, so that the heat transfer from the high-temperature side radiator 23 to the low-temperature side radiator 32 can be prevented from becoming excessive when the difference between the high and low pressures of the refrigeration cycle is small.

Thus, the difference in the temperature between the high-temperature coolant circuit 20 and the low-temperature coolant circuit 30 is increased to easily enlarge the difference between the high and low pressures of the refrigeration cycle, thus making it easy to increase the power of the compressor 11. Consequently, the heating capacities of the battery 33 and the low-temperature side radiator 32 can be improved easily.

Other Embodiments

Various modifications can be made to the above-mentioned embodiments as follows.

(1) Although in the above-mentioned embodiments, the coolant is used as the heat medium, various kinds of media, such as oil, may be used as the heat medium.

A nanofluid may be used as the heat medium. The nanofluid is a fluid in which nanoparticles having a particle diameter on the order of nanometers are mixed. By mixing the nanoparticles into the heat medium, the following effects can be obtained in addition to the function and effect of lowering the freezing point to make an antifreeze liquid, like the coolant using ethylene glycol.

That is, the mixing of nanoparticles in the heat medium can obtain the functions and effects of improving the thermal conductivity of the heat medium in a specific temperature zone, increasing the heat capacity of the heat medium, preventing corrosion of a metallic pipe and degradation of a rubber pipe, and enhancing the fluidity of the heat medium at ultralow temperature.

Such functions and effects vary depending on the configuration and shape of nanoparticles, the blending ratio thereof, and an additive.

Thus, the thermal conductivity can be improved, making it possible to obtain an equivalent cooling efficiency even when using a small amount of heat medium, compared to the coolant using ethylene glycol.

The heat capacity of the heat medium can be enhanced to increase the amount of stored cold heat due to sensible heat of the heat medium itself.

Furthermore, by increasing the amount of stored cold heat, the temperature regulation, such as cooling and heating, of the device can be performed using the stored cold heat for a certain period of time despite the compressor 11 not being in a state of operation, thus enabling energy saving of the refrigeration cycle device 10.

The aspect ratio of the nanoparticles is preferably 50 or more. This is because sufficient thermal conductivity can be obtained. The aspect ratio is a shape index representing the ratio of the width to the height of a nanoparticle.

The nanoparticles suitable for use include any one of Au, Ag, Cu and C. Specifically, as constituent atoms of the nanoparticles, Au nanoparticles, Ag nanowires, CNTs, graphene, graphite core-shell type nanoparticles, CNTs containing Au nanoparticles, and the like can be used.

CNT is a carbon nanotube. The graphite core-shell type nanoparticle is a particle body with a structure, such as a carbon nanotube, that surrounds the atoms described above.

(2) The refrigeration cycle device 10 of the above-mentioned embodiment may use a fluorocarbon refrigerant as the refrigerant, but the kind of the refrigerant is not limited thereto. A natural refrigerant, such as carbon dioxide, a hydrocarbon-based refrigerant, or the like may be used.

The refrigeration cycle device 10 of the above-mentioned embodiment configures a subcritical refrigeration cycle in which a high-pressure side refrigerant pressure does not exceed the critical pressure of the refrigerant, but may configure a supercritical refrigeration cycle in which the high-pressure side refrigerant pressure exceeds the critical pressure of the refrigerant.

(3) In the above-mentioned third embodiment, the high-temperature side radiator 23 and the low-temperature side radiator 32 are separate radiators, but are joined together via the common fin 39. Alternatively, the high-temperature side radiator 23 and the low-temperature side radiator 32 may configure one radiator.

For example, by integrating a tank of the high-temperature side radiator 23 and a tank of the low-temperature side radiator 32 with each other, the high-temperature side radiator 23 and the low-temperature side radiator 32 may be configured as one radiator.

(4) In the above-mentioned embodiment, a subcooler may be provided on the refrigerant outlet side of the receiver 40. The subcooler is a subcooling heat exchanger that exchanges heat between the liquid-phase refrigerant flowing thereinto from the receiver 40 and the coolant in the high-temperature coolant circuit 20 to subcool the liquid-phase refrigerant.

The receiver 40 and the subcooler may be integrally formed with the condenser 12.

(5) Although the first expansion valve 13 and the second expansion valve 16 are mechanically thermal expansion valves in the above-mentioned embodiment, the first expansion valve 13 may be an electric variable throttle mechanism. The electric variable throttle mechanism includes a valve body and an electric actuator. The valve body is configured to be capable of changing a passage opening degree (in other words, throttle opening degree) of the refrigerant passage. The electric actuator includes a stepping motor that changes the throttle opening degree of the valve body.

The operations of the first expansion valve 13 and the second expansion valve 16 may be controlled by a control signal output from the controller 60.

More specifically, each of the first expansion valve 13 and the second expansion valve 16 may be constituted of a variable throttle mechanism with a fully closing function of fully closing the refrigerant passage. The variable throttle mechanism with the fully closing function in each of the first expansion valve 13 and the second expansion valve 16 can block the flow of the refrigerant by fully closing the respective refrigerant passages.

What is claimed is:

1. A refrigeration cycle device comprising:
   a compressor configured to draw and discharge a refrigerant;
   a high-temperature side heat exchanger configured to exchange heat between the refrigerant discharged from the compressor and a heat medium;
   a decompression valve configured to decompress the refrigerant flowing out of the high-temperature side heat exchanger;
   a low-temperature side heat exchanger configured to exchange heat between the refrigerant decompressed by the decompression valve and the heat medium;
   a high-temperature side heat medium circuit in which the heat medium circulates to the high-temperature side heat exchanger;
   a low-temperature side heat medium circuit in which the heat medium circulates to the low-temperature side heat exchanger;

a heat exchanging portion located in the low-temperature side heat medium circuit to exchange heat with the heat medium; and a heat transfer portion configured to transfer heat from the high-temperature side heat medium circuit to the low-temperature side heat medium circuit and to cause the heat medium to dissipate heat in the heat exchanging portion.

2. The refrigeration cycle device according to claim 1, wherein the heat transfer portion includes a communication flow passage configured to communicate the high-temperature side heat medium circuit with the low-temperature side heat medium circuit such that the heat medium circulates between the high-temperature side heat medium circuit and the low-temperature side heat medium circuit, and the communication flow passage is configured such that at least a part of the heat medium flowing from the high-temperature side heat medium circuit into the low-temperature side heat medium circuit via the communication flow passage flows through the heat exchanging portion without passing through the low-temperature side heat exchanger.

3. The refrigeration cycle device according to claim 2, further comprising:

an opening/closing valve configured to open or close the communication flow passage; and a controller configured to control the opening/closing valve so as to open the communication flow passage after a temperature or voltage of the heat medium in the high-temperature side heat medium circuit is raised to a predetermined value or higher.

4. The refrigeration cycle device according to claim 1, further comprising:

a low-temperature side radiator configured to exchange heat between the heat medium in the low-temperature side heat medium circuit and outside air; and a high-temperature side radiator configured to exchange heat between the heat medium in the high-temperature side heat medium circuit and the outside air, wherein the heat transfer portion includes a coupling portion configured to couple the high-temperature side radiator and the low-temperature side radiator using a metal member and to transfer heat from the high-temperature side radiator to the low-temperature side radiator.

5. The refrigeration cycle device according to claim 1, further comprising:

a high-temperature side radiator configured to exchange heat between the heat medium in the high-temperature side heat medium circuit and outside air, wherein the heat exchanging portion is a low-temperature side radiator configured to exchange heat between the heat medium in the low-temperature side heat medium circuit and outside air; and a coupling portion configured to couple the high-temperature side radiator and the low-temperature side radiator using a metal member and to transfer heat from the high-temperature side radiator to the low-temperature side radiator.

6. The refrigeration cycle device according to claim 1, further comprising:

a low-temperature side radiator configured to exchange heat between the heat medium in the low-temperature side heat medium circuit and outside air;

a low-temperature side circulation switching valve configured to switch between a first state in which the heat medium circulates between the low-temperature side heat exchanger and the low-temperature side radiator and a second state in which the heat medium does not circulate between the low-temperature side heat exchanger and the low-temperature side radiator; and a controller configured to open the communication flow passage after the low-temperature side circulation switching valve is controlled to circulate the thermal medium between the low-temperature side heat exchanger and the low-temperature side radiator.

7. The refrigeration cycle device according to claim 1, further comprising:

a low-temperature side radiator configured to exchange heat between the heat medium in the low-temperature side heat medium circuit and outside air;

a low-temperature side circulation switching valve configured to switch between a first state in which the heat medium circulates between the heat exchanging portion and the low-temperature side radiator and a second state in which the heat medium does not circulate between the heat exchanging portion and the low-temperature side radiator; and a controller configured to open the communication flow passage after the low-temperature side circulation switching valve is controlled to circulate the thermal medium between the heat exchanging portion and the low-temperature side radiator.

8. The refrigeration cycle device according to claim 1, wherein the heat exchanging portion is a battery mounted on a vehicle.

9. The refrigeration cycle device according to claim 1, wherein the heat exchanging portion is an exterior heat exchanger configured to exchange heat between the heat medium in the low-temperature side heat medium circuit and outside air.

10. The refrigeration cycle device according to claim 1, further comprising:

a gas-liquid separator configured to separate the refrigerant flowing into the gas-liquid separator from the high-temperature side heat exchanger, into a gas-phase refrigerant and a liquid-phase refrigerant and cause the separated liquid-phase refrigerant to flow out to a side of the decompression valve.

11. The refrigeration cycle device according to claim 1, further comprising:

an evaporator configured to exchange heat between the refrigerant decompressed by the decompression valve and air to be blown into a space to be air-conditioned;

a high-temperature side radiator configured to exchange heat between the heat medium in the high-temperature side heat medium circuit and outside air;

a heater core configured to exchange heat between the heat medium in the high-temperature side heat medium circuit and air;

a low-temperature side radiator configured to exchange heat between the heat medium in the low-temperature side heat medium circuit and outside air; and a mode switching device configured to switch among an air-cooling mode in which heat is absorbed from the air into the refrigerant in the evaporator and heat is dissipated from the refrigerant into the outside air in the high-temperature side radiator, an air-heating mode in which heat is dissipated from the heat medium into the air in the heater core and heat is absorbed from the outside air into the refrigerant in the low-temperature side radiator, and a cooling mode in which the heat medium absorbs heat in the heat exchanging portion.

12. A refrigeration cycle device comprising:

a compressor configured to draw and discharge a refrigerant;

a first heat exchanger configured to exchange heat between the refrigerant discharged from the compressor and a heat medium;

a decompression valve configured to decompress the refrigerant flowing out of the high-temperature side heat exchanger;

a second heat exchanger configured to exchange heat between the refrigerant decompressed by the decompression valve and the heat medium;

a high-temperature side heat medium circuit in which the heat medium circulates to the high-temperature side heat exchanger;

a low-temperature side heat medium circuit in which the heat medium circulates to the low-temperature side heat exchanger;

a third heat exchanger located in the low-temperature side heat medium circuit to exchange heat between the heat medium in the low-temperature side heat medium circuit and outside air;

a fourth heat exchanger configured to exchange heat between the heat medium in the high-temperature side heat medium circuit and the outside air; and a coupling member made of a metal and coupled to the third heat exchanger and the fourth heat exchanger, to transfer heat from the fourth heat exchanger to the third heat exchanger.

* * * * *